(12) United States Patent
Tobishima et al.

(10) Patent No.: US 6,791,844 B2
(45) Date of Patent: Sep. 14, 2004

(54) ELECTRONIC INSTRUMENT (75) Inventors: Yasuyuki Tobishima, Kawagoe (JP);
Yasuharu Nakamura, Kawagoe (JP);
Akira Shimizu, Kawagoe (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 10/394,195

(22) Filed: Mar. 24, 2003

(65) Prior Publication Data

US 2003/0201671 A1 Oct. 30, 2003

(30) Foreign Application Priority Data

Apr. 11, 2002 (JP) ........................................ 2002-109265

(51) Int. Cl.[7] .......................... H05K 5/00; H05K 5/04; H05K 5/06
(52) U.S. Cl. ...................................... 361/759; 361/756
(58) Field of Search ................................. 361/683–686, 361/724–728, 731–733, 740, 741, 747, 756, 759, 801–803, 807, 809, 810, 823, 825; 312/223.2, 223.1, 333, 265.5, 265.6, 330.1; 292/262, 263

(56) References Cited

U.S. PATENT DOCUMENTS 5,185,804 A * 2/1993 Watanabe ..................... 381/86
5,510,957 A * 4/1996 Takagi ......................... 361/814

* cited by examiner

Primary Examiner—Phuong T. Vu
(74) Attorney, Agent, or Firm—Sughrue Mion, PLLC (57) ABSTRACT An electronic instrument has an instrument body 2, an operation unit 3, and an engagement link 4. The engagement link 4 removably attaches the operation unit 3 to the instrument body 2. The engagement link 4 has a first joint member 22 and a second joint member 23. The first joint member 22 engages with a lower end 3a of the operation unit 3. The second joint member engages with an upper end 3b of the operation unit 3. The link mechanism moves the second joint member 23 to release the second joint member 23 from the upper end 3b when the first joint member 22 moves toward an engaging position of the first joint member 22 with the lower end 3a. The link mechanism can move the second joint member 23 to engage with the upper end 3b while the first joint member 22 has been engaged with the lower end 3a.

16 Claims, 8 Drawing Sheets

ELECTRONIC INSTRUMENT

BACKGROUND OF THE INVENTION

1. Field of the Invention

The present invention relates to, for example, an electronic instrument such as an audio unit mounted on an automotive vehicle.

2. Related Art

Figure 13:
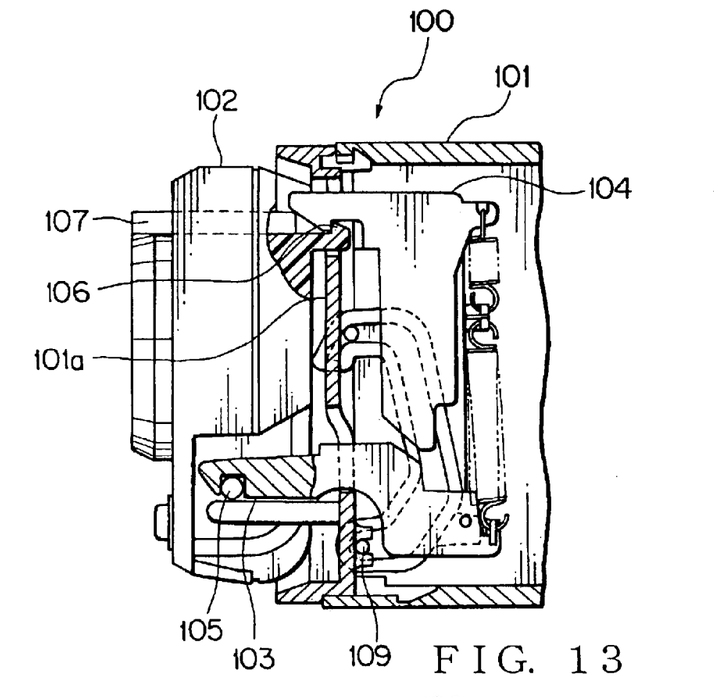
FIG. 13 is a sectional view showing a part of an ordinary CD player.
Figure 14:
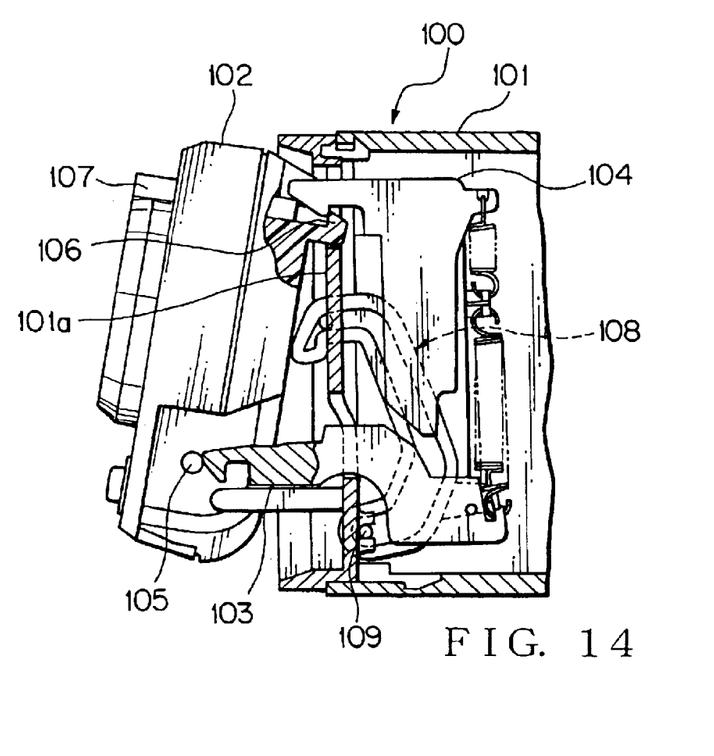
FIG. 14 is a sectional view showing a state in which a cover body has been attached to an instrument body of the player of the FIG. 13 while a first joint member is in a disengaged state.

An automotive vehicle has an instrument panel provided with a CD player 100 which is one of electronic instruments. FIGS. 13 and 14 are each a sectional view showing a part of the CD player 100. The CD player 100 reads out information stored on a record medium such as a compact disc (called as CD hereinafter).

The CD player 100 illustrated in FIG. 13 includes an instrument body 101 defining a flat box fitted to the instrument panel and a cover body 102 removably engaged with the instrument body 101. The instrument body 101, which has been mounted in the instrument panel, has a front surface 101a opposed to an occupant in the vehicle. The front surface 101a has an insertion opening (not shown) passing a CD.

The cover body 102 is engaged with the instrument body 101 so as to be pivotal around a lower end of the cover body 102, so that the cover body 102 opens and closes the insertion opening of the instrument body 101. The cover body 102 has a display area such as a liquid crystal display and a plurality of operational buttons.

The CD player 100 has a first joint portion 103 and a second joint portion 104 for removably engaging the cover body 102 with the instrument body 101 to open and close the insertion opening. The first joint portion 103 is positioned at each side end of the instrument body 101. The first joint portion 103 engages with a stopper pin 105 provided at a lower end of the cover body 102. The first joint portion 103 engaged with the stopper pin 105 supports the cover body 102 pivotally around the lower end.

The second joint portion 104 engages with a stopper hook 106 provided at an upper end of the cover body 102. The cover body 102 has a release button 107 for releasing the second joint portion 104 from the stopper hook 106. The second joint portion 104, which has engaged with the stopper hook 106, attaches the cover body 102 to the front surface 101a of the instrument body 101 to close the insertion opening. Operation of the release button 107 releases the upper end of the cover body 102 from the second joint portion 104. The first joint portion 103 is operable independently from the second joint portion 104 in engagement and disengagement movements with the corresponding stoppers.

In the CD player 100 described above, the first joint portion 103 and the second joint portion 104 are each engaged with the corresponding lower or upper end of the cover body 102 to attach the cover body 102 to the instrument body 101. A user pushes the release button 107 to release the engagement of the second joint portion 104 for reproducing a CD and pivots the cover body 102 around the lower end to open the insertion opening. The insertion of the CD through the opening automatically loads the CD in the instrument body. Then, the cover body 102 is pivoted reverse to close the insertion opening and the second joint portion 104 engages with the stopper hook 106 provided at the upper end of the cover body 102. Operation of a button of the cover body 102 can reproduce the CD.

In the CD player 100, the first joint portion 103 and the second joint portion 104 attach and remove the cover body 102 relative to the instrument body 101 independently from each other. Thus, as illustrated in FIG. 14, the first joint portion 103 can be in a disengaged state from the cover body 102 while the second joint portion 104 has engaged with the cover body 102. In this state, the cover body 102 will fall undesirably from the instrument body 101 when the release button 107 is operated to release the second joint portion 104 from the instrument body 101, since the first joint portion 103 has not engaged with the cover body 102. The unintentional dropout may undesirably cause breakdown of the cover body 102.

The CD player 100 has a pushing arm 108 for turning the cover body 102 to open the insertion opening while the engagement of the second joint portion 104 has been released. The pushing arm 108 is U-shaped in a side view thereof. The pushing arm 108 is turnably supported at one end thereof on the instrument body 101 and is resiliently urged at the other end thereof forward relative to the front surface 101a. The pushing arm 108 turns so that the other end protrudes from the front surface 101a on disengagement of the second joint portion 104. The pushing arm 108 pushes the cover body 102 to tern it to open the insertion opening.

The pushing arm 108 has a circular column pin 109 at one end thereof for turnably supporting the pushing arm 108 on the instrument body 101, while the instrument body 101 has a hole for passing the pin 109. The pin 109, which has been passed through the hole, is stopped by a C or E ring at each end thereof, so that the pushing arm 108 is turnably fitted in the instrument body 101.

This increases the number of parts for turnably fitting the pushing arm 108 in the instrument body 101, since a couple of C or E rings are required for stopping the pin 109 at each end thereof. This increases time and effort for attaching the pushing arm 108 on the instrument body 101 due to the insertion and stopping work for the pin 109 and the C or E rings. Thus, the fitting construction having the pushing arm 108 tends to increase a manufacturing cost of the electronic instrument.

SUMMARY OF THE INVENTION

In view of the above-mentioned situation, an object of the invention is to provide an electronic instrument that can prevent undesirable dropout of a cover body from an instrument body thereof.

For solving the problem to achieve an object, an electronic instrument according to the present invention comprises:

an instrument body and a cover body removably covering a surface of the instrument body, a first joint member mounted on the instrument body for engaging with a first end of the cover body, a second joint member mounted on the instrument body for engaging with a second end of the cover body, and a link mechanism, wherein the link mechanism moves the second joint member toward a disengaged position of the second joint member from the second end when the first joint member moves toward an engaged position of the first joint member with the first end, and the link mechanism allows the second joint member to engage with the second end after the first joint member has engaged with the first end.

Therefore, the link mechanism moves the second joint member toward a disengaged position of the second joint member from the second end when the first joint member moves toward an engaged position of the first joint member with the first end. Meanwhile, the link mechanism moves the second joint member to engage with the second end after the first joint member has engaged with the first end. This prevents the second joint member from engaging with the second end while the first joint member is not engaged with the first end.

Thus, the first joint member has surely engaged with the lower end of the operation unit so that the operation unit is held by the instrument body, even when the engagement of the second joint member is released. Thus, an unintentional dropout of the operation unit from the instrument body is surely eliminated even when the engagement of the second joint member is released with the operation unit being held by the instrument body.

Preferably, the link mechanism further includes:
a first urging member for resiliently urging the first joint member to engage the first joint member with the first end,
a second urging member for resiliently urging the second joint member to engage the second joint member with the second end,
a first abutment portion formed on the first joint member, and
a second abutment portion formed on the second joint member and being able to contact the first abutment portion,
wherein the first abutment portion contacts the second abutment portion to move the second joint member in a disengaging direction of the second joint member from the second end against a resilient force of the second urging member when the first joint member moves in an engaging direction of the first joint member with the first end, and a resilient force of the second urging member allows the second joint member to engage with the second end after the first joint member has engaged with the first end.

This prevents the second joint member from engaging with the upper end of the second joint member, while the first joint member has not engaged with the lower end of the operation unit. Thus, the first joint member has surely engaged with the lower end of the operation unit so that the operation unit is held by the instrument body, even when the engagement of the second joint member is released. Thus, unintentional dropout of the operation unit from the instrument body is surely eliminated even when the engagement of the second joint member is released with the operation unit being held by the instrument body.

Preferably, the first abutment portion inclines so as to gradually come away from the second joint member relative to a direction extending inward from the surface of the instrument body, and the second abutment portion inclines so as to gradually come close to the first joint member relative to a direction extending inward from the surface of the instrument body.

This moves the second joint member in a disengaging direction thereof while the first joint member moves to engage with the first end. This prevents the second joint member from engaging with the upper end of the second joint member, while the first joint member has not engaged with the lower end of the operation unit. Thus, the first joint member has surely engaged with the lower end of the operation unit so that the operation unit is held by the instrument body, even when the engagement of the second joint member is released. Thus, unintentional dropout of the operation unit from the instrument body is surely eliminated even when the engagement of the second joint member is released with the operation unit being held by the instrument body.

Preferably, the first joint member supports the cover body pivotally around the first end.

Thus, the insertion opening can be surely opened while the engagement of the second joint member is released. Through the opened insertion opening, a record medium can be surely inserted into and removed from the instrument body.

DETAILED DESCRIPTION OF THE PREFERRED EMBODIMENTS

Referring to FIGS. 1 to 12, an electronic instrument 1 of an embodiment of the invention will be discussed hereinafter. In each drawing, an insertion direction of a compact disc (called as a CD hereinafter) as a record medium into an instrument body 2 is defined as direction Y, and a lateral direction of the instrument body 2 is defined as direction X perpendicular to direction Y. A direction along a thickness of the instrument body 2 is defined as direction Z, which is perpendicular each of directions X and Y.

Figure 1:
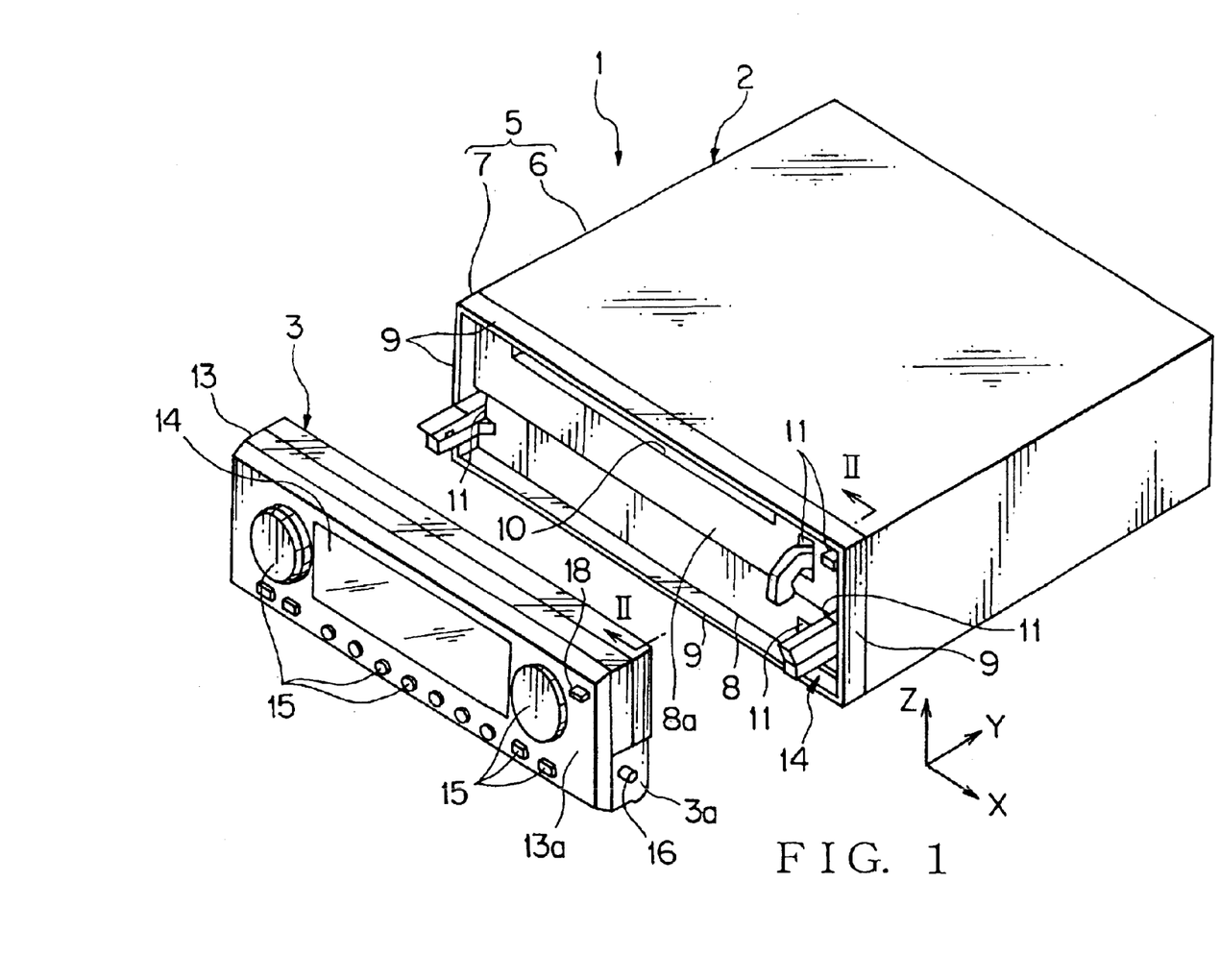
FIG. 1 is a perspective view showing an embodiment of an electronic instrument according to the present invention.

An automotive vehicle has an instrument panel provided with an electronic instrument shown in FIG. 1. The electronic instrument 1 has, for example, a CD player and an AM/FM tuner. The CD player receives a CD to read out (reproduce) information stored on the CD to output sounds. The AM/FM tuner receives AM/FM broadcasting radio waves to output them as sound information.

Figure 2:
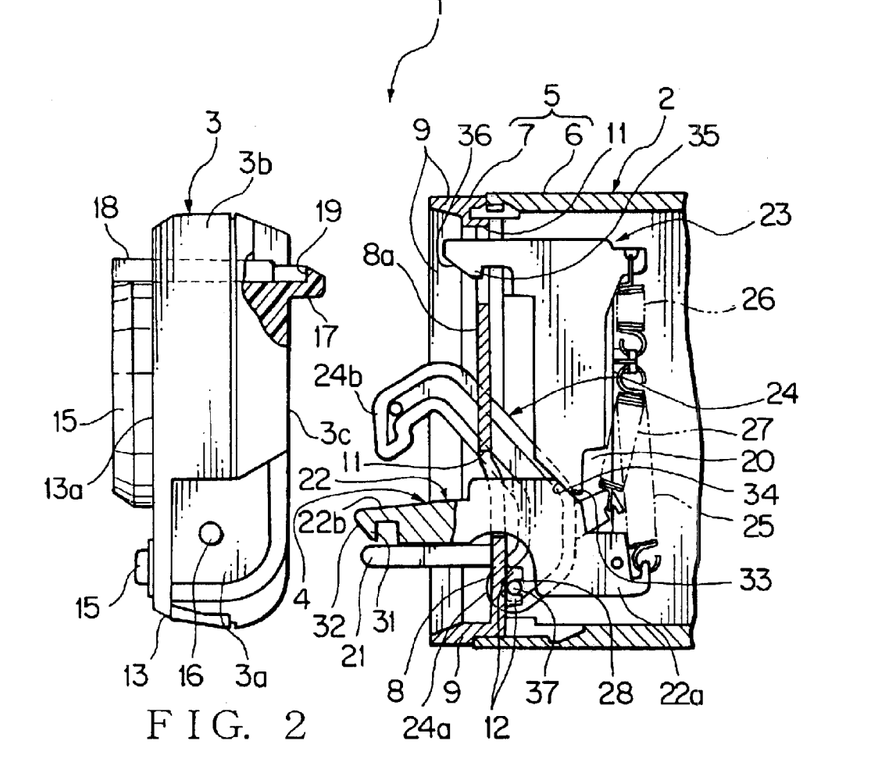
FIG. 2 is a sectional view taken along line II—II of FIG. 1.

As illustrated in FIGS. 1 and 2, the electronic instrument 1 includes the instrument body 2, an operation and display unit 3, and an engagement link 4. The instrument body 2 has a flat-box-shaped chassis 5 in which there are arranged the CD player and the AM/FM tuner. The chassis 5 has a chassis body 6 and a front panel 7 fitted to a fore side of the chassis body 6 in FIG. 1. The chassis body 6 is a flat box having a front opening as illustrated in FIG. 1. The chassis body 6 is defined, for example, by bending a metal plate.

The front panel 7 is fitted to the chassis body 6 to close the front opening. The front panel 7 has a generally flat wall 8 and a rising wall 9 unitarily rising from an outer periphery of the wall 8. The front panel 7 is fitted to the chassis body 6, so that the wall 8 closes the front opening. The wall 8 has a rectangular face.

The wall 8 is formed with an insertion opening 10 for inserting a CD into the instrument body 2 and ejecting the CD from the instrument body 2. The wall 8 is also provided with connectors (not shown). The insertion opening 10 penetrates through the wall 8 to pass the CD. The connectors are used for transmitting various signals from the operation unit 3 to the instrument body 2 and for transmitting various signals and an electrical power from the instrument body 2 to the operation unit 3 when the operation unit 3 is at a first position discussed later.

The wall 8 has a plurality of through holes 11 for passing a first joint member 22, a second joint member 23, and a pushing arm 24. The through holes 11 penetrate through the wall 8. Furthermore, the wall 8 has a pair of positioning projections 12 (see FIG. 2). The pair of positioning projections 12 protrude from a rear surface of the wall 8 inward of the instrument body 2.

That is, the positioning projection 12 extends in direction Y of FIG. 1. The pair of positioning projections 12 are vertically spaced from each other. The pair of positioning projections 12 are positioned at a front end of the front panel 7 in direction X of FIG. 1 and are positioned at a lower end of the front panel 7 in direction Z. The pair of positioning projections 12 define each a first positioning channel 28 extending in direction Y.

The wall 9 is defined to surround a front surface 8a of the wall 8 as illustrated in FIG. 1. The operation unit 3 is received in a space surrounded by the wall 9. The front surface 8a of the wall 8 is the surface described already. The front surface 8a is formed with an insertion opening 10 for passing a CD.

The CD player and the AM/FM tuner, which are received in the chassis 5, start when a user pushes a switch 15 described later of the operation unit 3.

As illustrated in FIG. 1, the operation unit 3 has a flat-box-shaped housing 13, a liquid crystal display (called as LCD hereinafter) 14 received in the housing 13 as a display panel, and various kinds of switches 15. The housing 13 is rectangular in a plan view thereof. A length of the housing 13 in direction X is substantially equal to the width of the chassis 5 of the instrument body 2. Another length of the housing 13 in direction Z is substantially equal to the depth of the chassis 5 of the instrument body 2.

LCD 14 has a display surface as a displaying area to indicate various information for a user. The switches 15 constitute an operation part for the user. The displaying surface and the operation part are provided on a front surface 13a positioned in a front side of the housing 13 shown in FIG. 1.

The user can operate one of the switches 15 on the operation unit 3 to select broadcasting channels provided in the AM/FM tuner. LCD 14 of the operation unit 3 displays information including a selected broadcasting channel and a corresponding radio wave frequency.

The user can operate another of the switches 15 on the operation unit 3 to select a music reproduced by the CD player. LCD 14 of the operation unit 3 displays information including a selected track (music) number.

The operation unit 3 has a pin 16 protruding in direction X from each side end of the operation unit 3 (only a front one of the pins is illustrated in FIG. 1). The pin 16 extends in the direction X. The pin 16 is positioned at a lower end 3a of the operation unit 3 in direction Z. The lower end 3a is the one end described in the specification.

Furthermore, the operation unit 3 has a stopper projection 17 and a release button 18 at a front end of the operation unit 3 indirection X. As illustrated in FIG. 2, the stopper projection 17 protrudes from a rear surface 3c opposed to the front surface 13a of the operation unit 3. The stopper projection 17 protrudes from the rear surface 3c toward the wall 8 of the front panel 7. The stopper projection 17 has a recess 19 in an upper surface of the stopper projection 17.

The release button 18 is shaped in a rod. The release button 18 is elongated in direction Y. The release button 18 is positioned at an upper end 3b of the operation unit 3 in direction Z. The upper end 3b is the second end described in the invention summary. The release button 18 is attached to the housing 13 slidably in the elongated direction thereof. One end of the release button 18 moves into and out of the front surface 13a of the housing 13, and the other end of the release button 18 moves into and out of the rear surface 3c of the housing 13 opposed to the front surface 13a. The release button 18 slides such that the other end of the release button 18, which is extended from the rear surface 3c, moves into and out of the recess 19.

Figure 5:
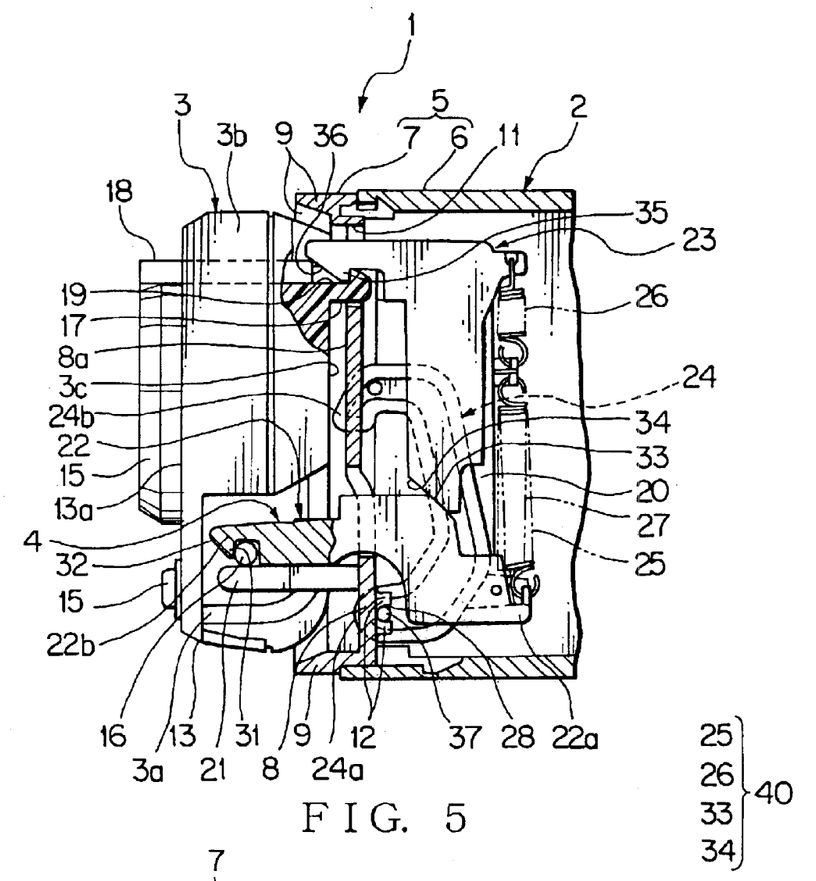
FIG. 5 is a sectional view showing a state in which the first joint member has engaged with a pin and the second joint member has engaged with a recess of a stopper hook to be changed from the state of FIG. 4.
Figure 7:
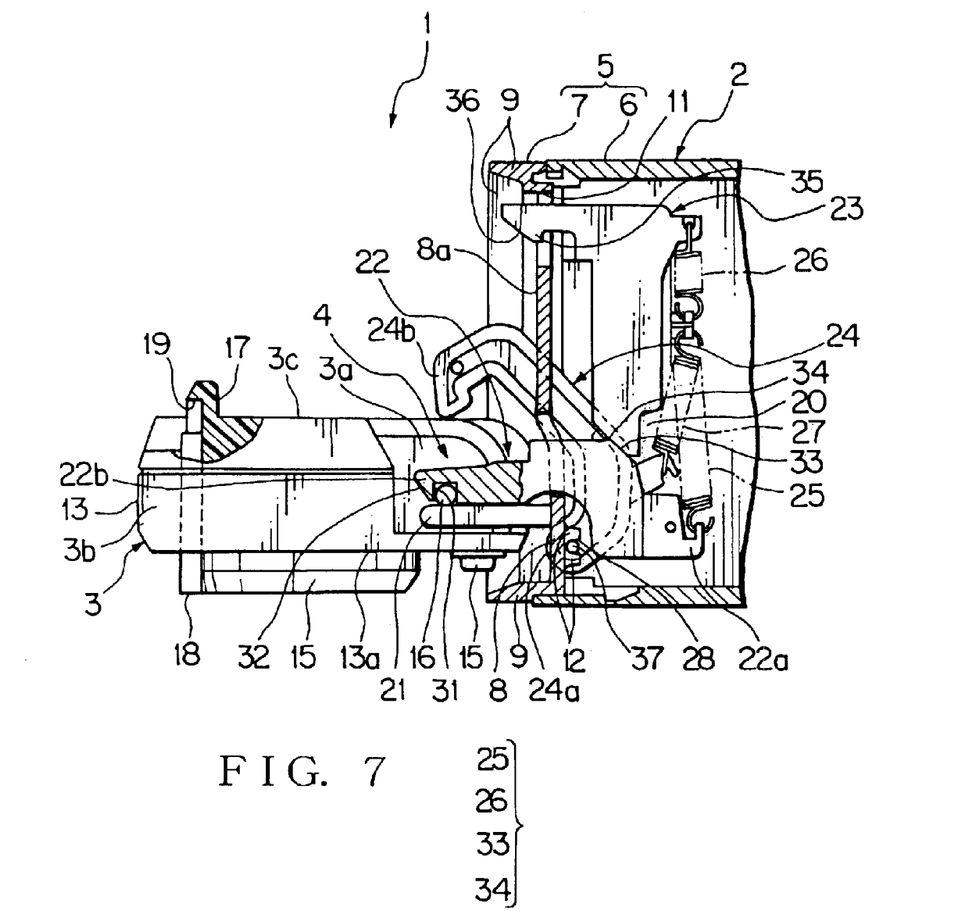
FIG. 7 is a sectional view showing a state in which the engagement of the second joint member has been released so that the operation unit has opened an insertion opening of the instrument body to be changed from the state of FIG. 6.

The operation unit 3 is removably attached to the front surface 8a of the wall 8 of the front panel 7 of the instrument body 2 by means of the engagement link 4. The operation unit 3 is supported by the first joint member 22 turnably around the pin 16 to move between a first position and a second position thereof. The operation unit 3 covers the front surface 8a to close the insertion opening 10 at the first position as illustrated in FIG. 5, and the operation unit 3 opens a part of the front surface 8a, that is, opens the insertion opening 10 at the second position as illustrated in FIG. 7.

As illustrated in FIG. 2, the engagement link 4 has a pair of frames 20 (only one of them is illustrated in FIG. 2), a pair of guide pins 21 (only one of them is illustrated in FIG. 2) a pair of first joint members 22 (only one of them is illustrated in FIG. 2), the second joint member 23, the pushing arm 24, a first coil spring 25 which is the first urging means, a second coil spring 26 which is the second urging means, and a third coil spring 27 which is the third urging means.

The frame 20 is received in the chassis 5 of the instrument body 2. The pair of frames 20 are attached each to both the chassis body 6 of the chassis 5 and the front panel 7. The pair of frames 20 are spaced from each other in direction X (lateral direction) of the instrument body 2.

Figure 8:
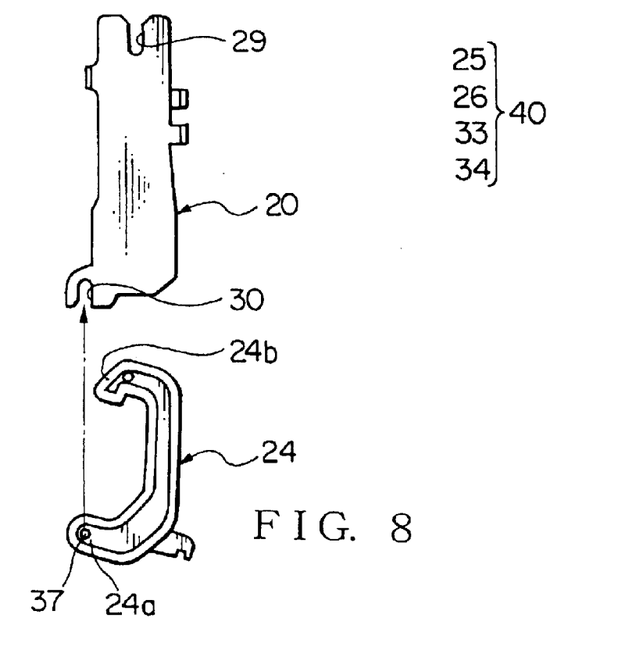
FIG. 8 is a side view showing a state in which a pushing arm is going to attach to a frame of the electronic instrument of FIG. 1.

As illustrated in FIG. 8, each frame 20 has a support channel 29 and a second positioning channel 30. The support channel 29 extends vertically from an upper end periphery of the frame 20. The support channel 29 supports the second joint member 23 slidably in a vertical direction. The second positioning channel 30 is opened at a lower periphery of the frame 20 and extends vertically. That is, the second positioning channel 30 extends in direction Z of FIG. 1.

The pair of guide pins 21 are fixed to the wall 8 of the front panel 7. Each guide pin 21 projects outward from the front surface 8a of the wall 8. The guide pin 21 is elongated in direction Y. The pair of guide pins 21 are spaced from each other in direction X (in a width direction of the instrument body 2). The pair of guide pins 21 hold the operation unit 3 therebetween in direction X and are positioned under the pins 16, when the operation unit 3 is attached to the instrument body 2 by means of the engagement link 4.

The pair of first joint members 22 are fitted each to each frame 20. The first joint member 22 is attached to the frame 20 such that the first joint member 22 extends in direction Y. The first joint member 22 attached to the frame 20 has one end 22a positioned in the instrument body 2 and the other end 22b extended from the instrument body 2 through the hole 11. The other end 22b overlies the guide pin 21.

The first joint member 22 is coupled to the frame 20 turnably around the one end 22a. The first joint member 22 is attached to the instrument body 2 via the frame 20. The other end 22b of the first joint member 22 is formed with a first stopper hook 31 and a tapered surface 32. The first stopper hook 31 engages with the pin 16 of the operation unit 3. Thus, the first joint member 22 engages with the lower end 3a of the operation unit 3. The first joint member 22 holds the pin 16 between the first stopper hook 31 and the guide pin 21.

As illustrated in FIG. 2, the tapered surface 32 is opposed to the pin 16 when the operation unit 3 is coupled to the instrument body 2. The tapered surface 32 inclines gradually upward in an outward direction of the instrument body 2.

The first joint member 22 is formed with a first inclined surface 33 defining a first abutting part at a longitudinal middle portion of the first joint member 22. The first inclined surface 33 inclines gradually downward in direction Y, i.e., in a direction oriented inward of the instrument body 2 from the front surface 8a to gradually away from the second joint member 23. The inward direction of the instrument body 2 is perpendicular to the front surface 8a and comes away from a user of the electronic instrument 1. The inward direction of the instrument body 2 is a direction of a CD inserted into the instrument body 2.

The first joint member 22 has a length extended from the front surface 8a of the wall 8 of the first joint member 22 outward of the instrument body 2 is larger than that of the second joint member 23 extended from the front surface 8a of the wall 8 of the first joint member 22 outward of the instrument body 2. By the extended length of the first joint member 22, the tapered surface 32 of the first joint member 22 contacts the pin 16 before a tapered surface 36 (described later) of the second joint member 23 contacts the stopper projection 17.

The second joint member 23 is attached to one of the frames 20 which is positioned in a front side in FIG. 1. Thus, the second joint member 23 is coupled to the instrument body 2 via the frame 20. The second joint member 23 is attached to the frame 20 vertically slidably in direction Z. The second joint member 23 is arranged above the first joint member 22.

The second joint member 23 unitarily has a second inclined surface 34 which is a second abutting portion, a second stopper hook 35, and a tapered surface 36. The second inclined surface 34 is received in the instrument body 2. The second inclined surface 34 contacts the first inclined surface 33. The second inclined surface 34 is parallel to the first inclined surface 33. The second inclined surface 34 inclines gradually downward in direction Y, i.e., in a direction oriented inward of the instrument body 2 from the front surface 8a so as to gradually come toward the first joint member 22.

The second stopper hook 35 extends out of the instrument body 2 via the through hole 11. The second stopper hook 35 is shaped in a hook. The second stopper hook 35 can engage with the recess 19 of the stopper projection 17. The second joint member 23 holds the upper end 3b of the operation unit 3. The second stopper hook 35 of the second joint member 23 engages with the recess 19 of the stopper projection 17 while the second inclined surface 34 is contacting the first inclined surface 33 of the first joint member 22 with the pin 16 being held between the guide pin 21 and first joint member 22.

As illustrated in FIG. 2, the tapered surface 36 opposes to the stopper projection 17 when the operation unit 3 is attached to the instrument body 2. The tapered surface 36 inclines gradually upward in an outward direction of the instrument body 2.

The pushing arm 24 is defined in a C-shape in a side view thereof by bending a rod. The pushing arm 24 has one end 24a and the other end 24b which protrude outward from the through hole 11, and a middle part of the pushing arm 24 is received in the chassis 5 of the instrument body 2. The pushing arm 24 is provided with a projection 37 at the one end 24a. The projection 37 is a circular column projecting in direction X from the one end 24a of the pushing arm 24. The projection 37 is positioned between the pair of positioning projections 12 of the front panel 7, i.e., in the first positioning channel 28. The projection 37 is also positioned in the second positioning channel 30 of the frame 20.

The pushing arm 24, which is positioned by the first positioning channel 28 and the second positioning channel 30, is supported turnably around the projection 37, i.e., around the one end 24a. The other end 24b of the pushing arm 24 turns around the projection 37, so that the pushing arm 24 moves between a state extended outward from the instrument body 2 via the through hole 11 and another state where the pushing arm 24 is received within the pushing arm 24. The other end 24b of the pushing arm 24 can contact the rear surface 3c of the operation unit 3 when extended outward from the instrument body 2.

The first coil spring 25 is positioned between the one end 22a of the first joint member 22 and the frame 20 to be coupled to both of them. The first coil spring 25 is incorporated with a torsion bar (not shown) to urge the first joint member 22 such that the other end 22b of the first joint member 22 moves to contact the guide pin 21. That is, the first coil spring 25 urges the first joint member 22 to stop the pin 16, i.e., the lower end 3a of the operation unit 3.

The second coil spring 26 is coupled to both an upper end of the second joint member 23 and the frame 20. The second coil spring 26 urges the second joint member 23 downward.

That is, the second coil spring 26 urges the second joint member 23 toward the engagement of the recess 19 of the stopper projection 17 or the upper end 3b of the operation unit 3. The second coil spring 26 urges the second joint member 23 such that the second inclined surface 34 contacts the first inclined surface 33. That is, the second coil spring 26 urges the second joint member 23 toward the first joint member 22.

The third coil spring 27 is connected to both the one end 24a of the pushing arm 24 and the frame 20 therebetween. The third coil spring 27 urges the pushing arm 24 to push the other end 24b out of the instrument body 2.

The link mechanism 40 described in the summary of the invention is constituted by the first inclined surface 33, the second inclined surface 34, the first coil spring 25, and the second coil spring 26. Thus configured link mechanism 40 moves the second joint member 23 against the urging force of the second coil spring 26 when the first joint member 22 moves to its engaging point with the lower end 3a. This moves the second joint member 23 to disengage it from the upper end 3b due to the abutment of the first inclined surface 33 and the second inclined surface 34. However, the urging force of the second coil spring 26 moves the second joint member 23 to engage it with the lower end 3a after the first joint member 22 has engaged with the lower end 3a. The second stopper hook 35 of the second joint member 23 can not engage with the recess 19 of the stopper projection 17 until the first stopper hook 31 of the first joint member 22 engages with the pin 16 of the first stopper hook 31. Because, the first inclined surface 33 contacts the second inclined surface 34, while the first coil spring 25 and the second coil spring 26 urge the first joint member 22 and the second joint member 23 in the directions described above.

When the operation unit 3 is attached to the instrument body 2 via thus configured engagement link 4, first, as illustrated in FIG. 2, the operation unit 3 is positioned relative to the instrument body 2 such that the rear surface 3c becomes parallel to the front surface 8a of the wall 8. At this step, the other end 22b of the first joint member 22 is contacting the guide pin 21 and the first inclined surface 33 is abutting against the second inclined surface 34. Furthermore, the other end 24b of the pushing arm 24 extends outward from the instrument body 2 via the through hole 11.

Figure 3:
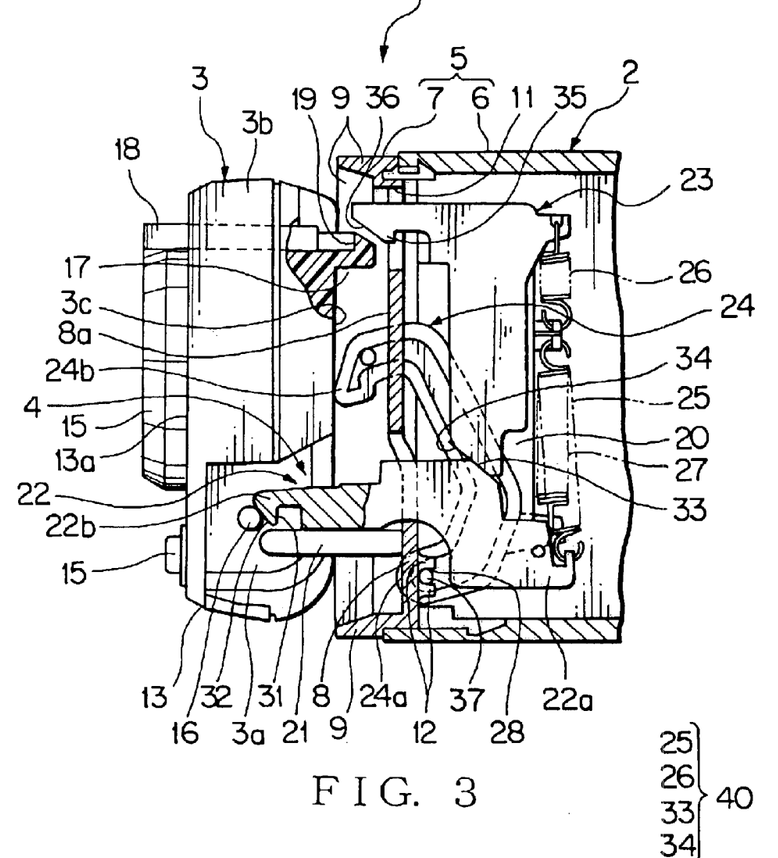
FIG. 3 is a sectional view showing a state in which an operation unit has come close to an instrument body from the state of FIG. 2.

Then, the operation unit 3 is moved toward the front surface 8a while the rear surface 3c keeps parallel to the front surface 8a of the wall 8, until the tapered surface 32 of the first joint member 22 contacts the pin 16 as illustrated in FIG. 3. Since the tapered surface 32 inclines gradually upward in a direction extending outward from the instrument body 2, the first joint member 22 turns against the urging force of the first coil spring 25 such that the other end 22b rides over the pin 16.

Figure 4:
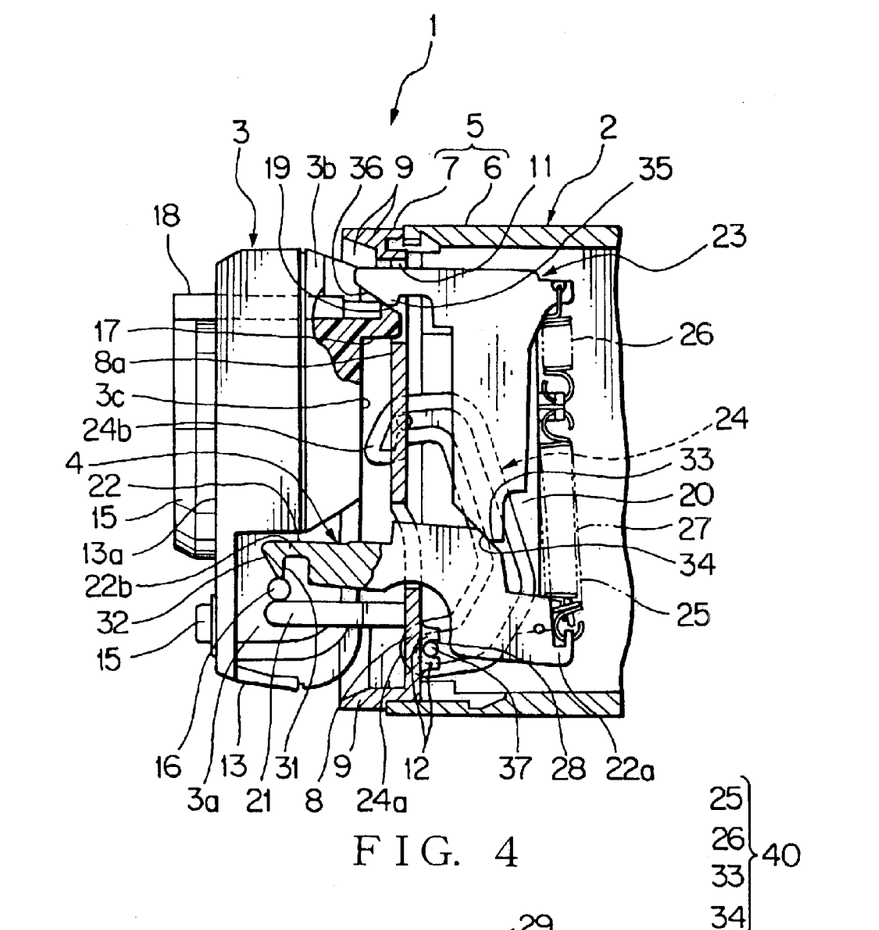
FIG. 4 is a sectional view showing a state in which a first joint member has turned and a second joint member has moved from the state of FIG. 3.

Since the first inclined surface 33 and the second inclined surface 34 having the inclinations contact each other, the second joint member 23 moves gradually upward against the resilient force of the second coil spring 26 as illustrated in FIG. 4. The link mechanism 40 moves the second joint member 23 against the urging force of the second coil spring 26 when the first joint member 22 moves toward the engagement with the pin 16, i.e., with the lower end 3a of the operation unit 3. This moves the second joint member 23 to disengage it from the stopper projection 17, i.e., from the upper end 3b of the operation unit 3.

Next, the operation unit 3 is further moved close to the front surface 8a of the wall 8 of the front panel 7, so that the first stopper hook 31 engages with the pin 16, and the second stopper hook 35 engages with the recess 19 of the stopper projection 17 by the resilient force of the second coil spring 26 as illustrated in FIG. 5. That is, the first joint member 22 engages with the lower end 3a of the operation unit 3, and the second joint member 23 engages with the upper end 3b of the operation unit 3. The link mechanism 40 moves the second joint member 23 to engage it with the lower end 3a after the first joint member 22 has engaged with the lower end 3a. Thereby, the first joint member 22 engages with the pin 16, and the pin 16 is held between the first joint member 22 and the guide pin 21, while the second stopper hook 35 of the second joint member 23 moves into the recess 19 of the stopper projection 17.

As illustrated in FIGS. 2 to 5, the other end 24b of the pushing arm 24 contacts the rear surface 3c of the operation unit 3 when the operation unit 3 is moved toward the instrument body 2 for the attachment of the operation unit 3. Then, the rear surface 3c of the operation unit 3 pushes the other end 24b, and the pushing arm 24 turns against the resilient force of the third coil spring 27 such that the other end 24b is received in the instrument body 2.

Figure 6:
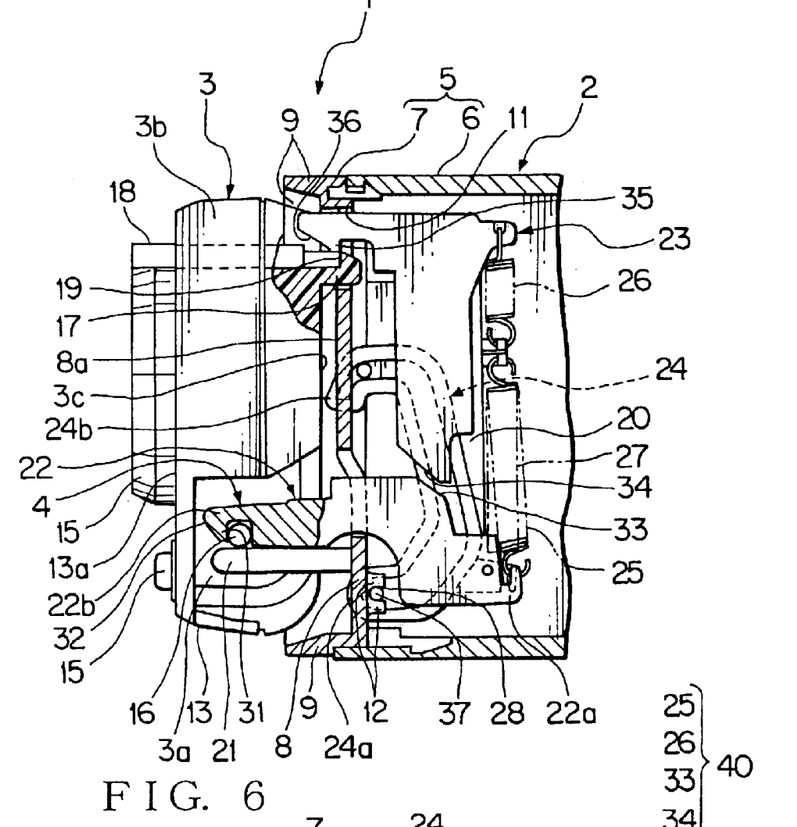
FIG. 6 is a sectional view showing a state in which a release button has been pushed toward an instrument body of the electronic instrument to be changed from the state of FIG. 5.

For opening the front surface 8a of the wall 8 of the front panel 7 to expose the insertion opening 10 from the first position illustrated in FIG. 5, first, the release button 18 is pushed toward the instrument body 2 as illustrated in FIG. 6. Thereby, the release button 18 contacts the tapered surface 36 of the second joint member 23. The second joint member 23 moves upward since the tapered surface 36 inclines gradually upward in a direction extending from the instrument body 2. Thereby, the second stopper hook 35 disengages from the recess 19 of the stopper projection 17, so that the second joint member 23 is released from the recess 19 of the stopper projection 17, i.e., from the upper end 3b of the operation unit 3.

Then, the pushing arm 24 turns by the resilient force of the third coil spring 27, so that the other end 24b extends outward from the instrument body 2 through the hole 11. The other end 24b of the pushing arm 24 abuts against the rear surface 3c of the operation unit 3, so that the operation unit 3 turns around the pin 16, i.e. , around the lower end 3a to open the insertion opening 10. Thus, the operation unit 3 moves from the first position shown in FIG. 5 to the second position shown in FIG. 7. To move the operation unit 3 from the second position shown in FIG. 7 to the first position shown in FIG. 5, the operation unit 3 is turned around the pin 16 such that the upper end 3 b of the operation unit 3 comes toward the front surface 8a of the wall 8 of the front panel 7.

To disengage the operation unit 3 from the instrument body 2 in the state shown in FIG. 7, the first joint member 22 is turned against the resilient force of the first coil spring 25 and the torsion bar (not shown) such that the other end 22b comes away from the guide pin 21. Thereby, the pin 16 is released from the first joint member 22, i.e., from the lower end 3a of the operation unit 3, so that the operation unit 3 is removed from the instrument body 2.

Figure 9:
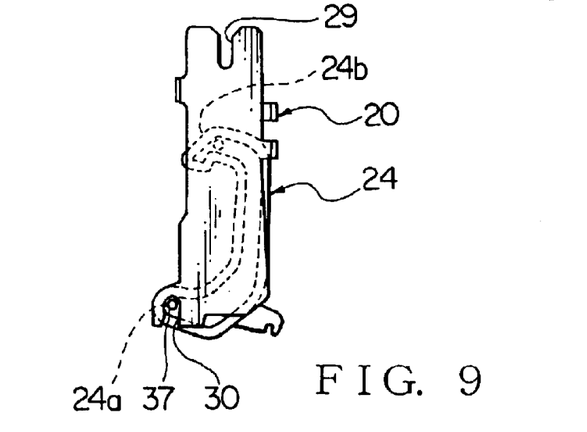
FIG. 9 is a side view showing a state in which the pushing arm has been attached to the frame to be changed from the state of FIG. 8.
Figure 10:
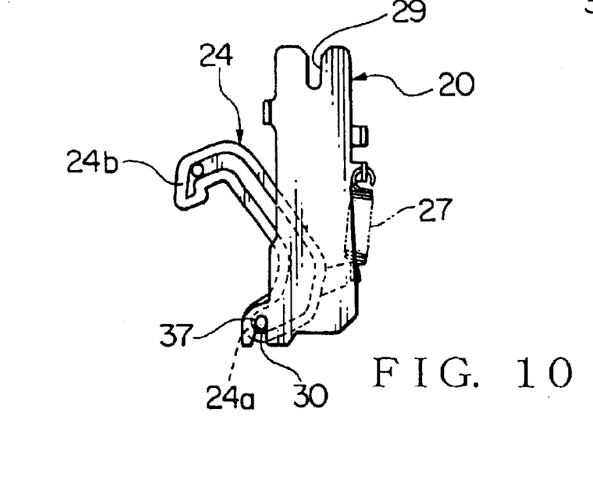
FIG. 10 is a side view showing a state in which a third coil spring has been connected to both the pushing arm and the frame to be changed from the state of FIG. 9.

The engagement link 4 is assembled as described hereinafter. Particularly, the pushing arm 24 is coupled to the frame 20, and then these are attached to the front panel 7. As illustrated in FIG. 8, the pushing arm 24 is moved toward the frame 20 along an elongated direction of the second positioning channel 30. Then, as illustrated in FIG. 9, the projection 37 positioned at the one end 24a of the pushing arm 24 is inserted into the second positioning channel 30 of the frame 20. Thereafter, as illustrated in FIG. 10, the third coil spring 27 is positioned between the one end 24a of the pushing arm 24 and the frame 20 to be connected thereto. Thus, the pushing arm 24 is preliminarily attached to the frame 20.

Figure 11:
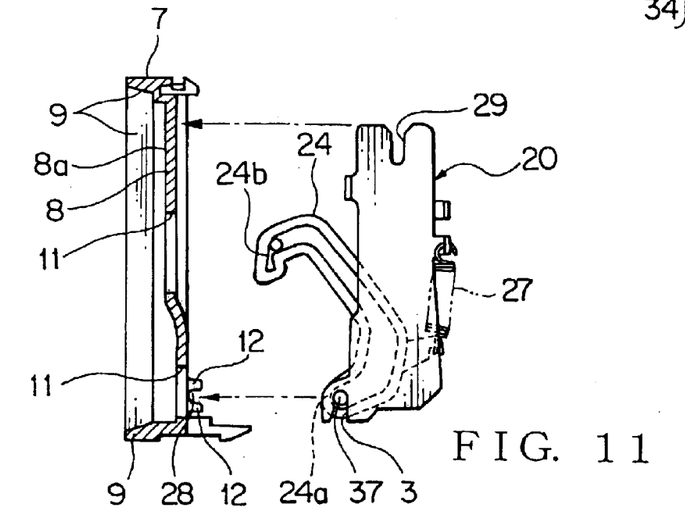
FIG. 11 is an explanatory illustration showing a front panel of the electronic instrument and a state in which the pushing arm and the frame are assembled with each other to be changed from the state of FIG. 10.
Figure 12:
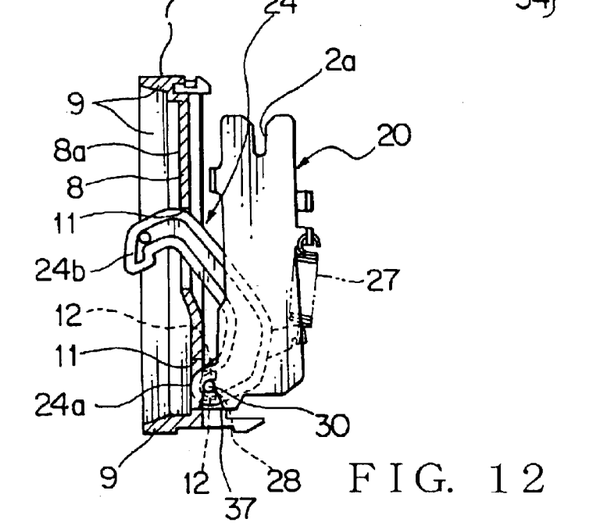
FIG. 12 is an explanatory illustration showing a state in which the front panel, the pushing arm, and the frame are assembled with each other to be changed from the state of FIG. 11.

Next, as illustrated in FIG. 11, the frame 20 with the pushing arm 24 is moved toward the front panel 7, and the first positioning channel 28 of the front panel 7 receives the projection 37 positioned at the one end 24a of the pushing arm 24 as illustrated in FIG. 12. Thus, the projection 37 is received in both the first positioning channel 28 and the second positioning channel 30 which is perpendicular to the first positioning channel 28 to be positioned therein. The projection 37 is inserted into the first positioning channel 28 after the second positioning channel 30 receives the second positioning channel 30, so that the projection 37 or the one end 24a of the pushing arm 24 is positioned as a pivot.

In this embodiment, the link mechanism 40 has the first coil spring 25 and the second coil spring 26 for urging the first joint member 22 and the second joint member 23 to hold the operation unit 3. The link mechanism 40 also has the first inclined surface 33 and the second inclined surface 34 abutting against each other. The first inclined surface 33 inclines gradually to come away from the second joint member 23 relative to a direction extending outward from the front surface 8a of the instrument body 2. The second inclined surface 34 inclines gradually to come toward the first joint member 22 relative to a direction extending inward from the front surface 8a of the instrument body 2.

This surely moves the second joint member 23 in a direction to release the engagement of the upper end 3b of the operation unit 3 by means of the first inclined surface 33 and the second inclined surface 34 which abut against each other, when the first joint member 22 moves toward its engagement position with the lower end 3a of the operation unit 3.

However, after the first joint member 22 has engaged with the lower end 3a of the operation unit 3, the second joint member 23 surely engages with the upper end 3b by the resilient forces of the first coil spring 25, the second coil spring 26, and the torsion bar (not shown).

This prevents the second joint member 23 from engaging with the upper end 3b of the second joint member 23, while the first joint member 22 has not engaged with the lower end 3a of the operation unit 3. Thus, the first joint member 22 has surely engaged with the lower end 3a of the operation unit 3 so that the operation unit 3 is held by the instrument body 2, even when the engagement of the second joint member 23 is released. Thus, an unintentional dropout of the operation unit 3 from the instrument body 2 is surely eliminated even when the engagement of the second joint member 23 is released with the operation unit 3 being held by the instrument body 2.

Furthermore, on the engagement of the first joint member 22 with the lower end 3a, the operation unit 3 is supported turnably around the lower end 3a. Thus, at least a part of the front surface 8a, that is, the insertion opening 10 is surely opened when the engagement of the second joint member 23 is released. Through the opened insertion opening 10, a CD can be surely inserted into and removed from the instrument body 2.

In addition, the aforementioned embodiment enables an electronic instrument described hereinafter. An electronic instrument has an instrument body having a face formed with an insertion opening for passing a record medium therethrough. The electronic instrument also has a cover body removably attached to the face of the instrument body and can cover the insertion opening. The cover body can be moved between a first position for closing the insertion opening and a second position for opening the insertion opening when attached to the instrument body. The electronic instrument further has a frame attached to the instrument body, a panel constituting the face, a pushing member urged to push the cover body from the first position toward the second position, a first positioning channel provided in the panel, and a second positioning channel formed in the frame perpendicularly to the first positioning channel. The pushing member has a projection for turnably supporting the cover body on the instrument body. The projection is received both in the first positioning channel and in the second positioning channel so that the pushing member is turnably supported by the instrument body.

An object of the electronic instrument is to decrease the number of parts and an assembling time thereof.

The electronic instrument requires only the frame and the panel for allowing the pushing member to be turnable. The first and second positioning channels are positioned perpendicular to each other so that the projection can be surely supported turnably. The said panel corresponds to the front panel 7 of the embodiment, and the said pushing member corresponds to the pushing arm 24 of the embodiment.

What is claimed is:

1. An electronic instrument comprising:
an instrument body and a cover body removably covering a surface of the instrument body,
a first joint member mounted on the instrument body for engaging with a first end of the cover body,
a second joint member mounted on the instrument body for engaging with a second end of the cover body, and
a link mechanism,
wherein the link mechanism moves the second joint member toward a disengaged position of the second joint member from the second end when the first joint member moves toward an engaged position of the first joint member with the first end, and the link mechanism allows the second joint member to engage with the second end after the first joint member has engaged with the first end.

2. The electronic instrument according to claim 1 wherein the link mechanism comprises:
a first urging member for resiliently urging the first joint member to engage the first joint member with the first end,
a second urging member for resiliently urging the second joint member to engage the second joint member with the second end,
a first abutment portion formed on the first joint member, and
a second abutment portion formed on the second joint member and being able to contact the first abutment portion,
wherein the first abutment portion contacts the second abutment portion to move the second joint member in a disengaging direction of the second joint member from the second end against a resilient force of the second urging member when the first joint member moves in an engaging direction of the first joint member with the first end, and a resilient force of the second urging member allows the second joint member to engage with the second end after the first joint member has engaged with the first end.

3. The electronic instrument according to claim 2 wherein the first abutment portion inclines so as to gradually come away from the second joint member relative to a direction extending inward of the instrument body from the surface of the instrument body, and the second abutment portion inclines so as to gradually come close to the first joint member relative to a direction extending inward of the instrument body from the surface of the instrument body.

4. The electronic instrument according to claim 1 wherein the first joint member supports the cover body pivotally around the first end.

5. The electronic instrument according to claim 1, wherein the link mechanism moves the second joint member in a first direction, which is substantially perpendicular to a second direction in which the cover body is moved to be attached to the instrument body.

6. The electronic instrument according to claim 3, wherein the first joint member supports the cover body pivotally around the first end.

7. The electronic instrument according to claim 6, wherein the link mechanism moves the second joint member in a first direction, which is substantially perpendicular to a second direction in which the cover body is moved to be attached to the instrument body.

8. The electronic instrument according to claim 1, wherein the link mechanism moves the second joint member to engage with the second end after the first joint member has engaged with the first end.

9. An electronic instrument, comprising:
an instrument body having a first connector and a second connector; and
a cover body that removably covers a surface of the instrument body,
wherein the first connector engages a first end of the cover body when the first connector is in a first engagement position,
wherein the first connector disengages the first end of the cover body when the first connector is in a first disengagement position,
wherein the second connector engages a second end of the cover body when the second connector is in a second engagement position,
wherein the second connector disengages the second end of the cover body when the second connector is in a second disengagement position,
wherein the first connector is operably coupled to the second connector such that the second connector moves towards the second disengaged position when the first connector moves towards the first engaged position.

10. The electronic instrument according to claim 9, wherein the first connector is operably coupled to the second connector such that the second connector moves to the second engagement position while the first connector has moved to the first engagement position.

11. The electronic instrument according to claim 9, wherein the first connector and the second connector are operably coupled via an elastic member.

12. The electronic instrument according to claim 9, wherein the first connector comprises a first abutting surface,
wherein the second connector comprises a second abutting surface that abuts against the first abutting surface, and
wherein a movement of the first connector is transferred to the second connector via the abutment of the first abutting surface and the second abutting surface.

13. The electronic instrument according to claim 9, wherein the first abutting surface is substantially parallel with the second abutting surface.

14. The electronic instrument according to claim 13, wherein the first abutting surface and the second abutting surface are inclined with respect to a direction in which the cover body is moved towards the instrument body to be attached to the instrument body.

15. The electronic instrument according to claim 1 wherein the first end of the cover body is located lower than the second end of the cover body when the cover body is attached to the instrument body.

16. The electronic instrument according to claim 9 wherein the first end of the cover body is located lower than the second end of the cover body when the cover body is attached to the instrument body.

* * * * *